Oct. 15, 1935. H. B. LINDSAY 2,017,629
INSULATED HOUSING STRUCTURE
Filed Nov. 9, 1931 6 Sheets-Sheet 3
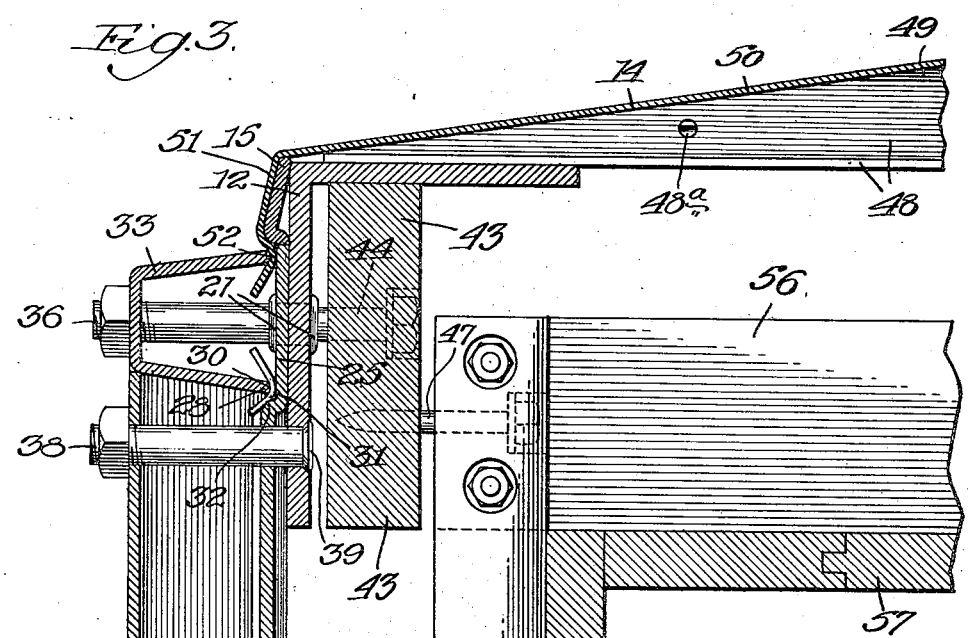
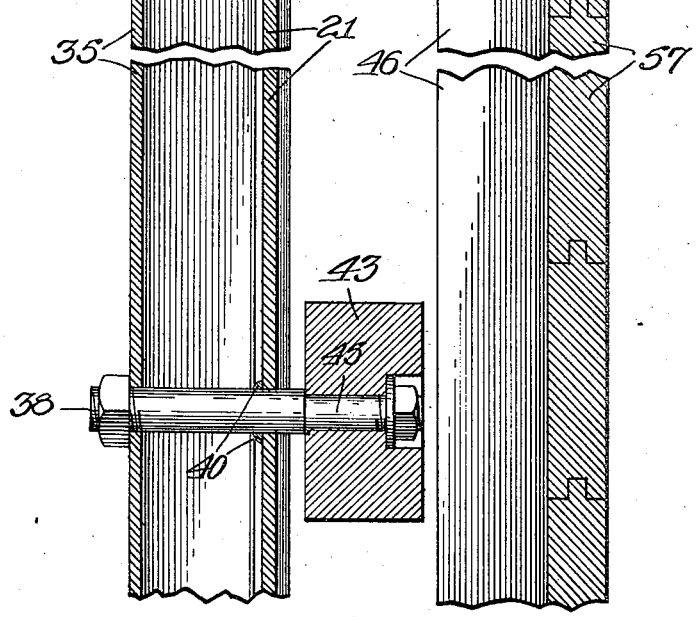
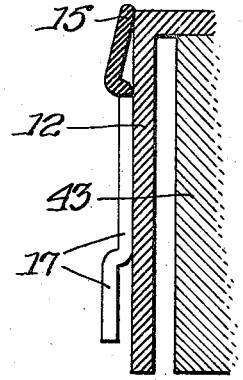

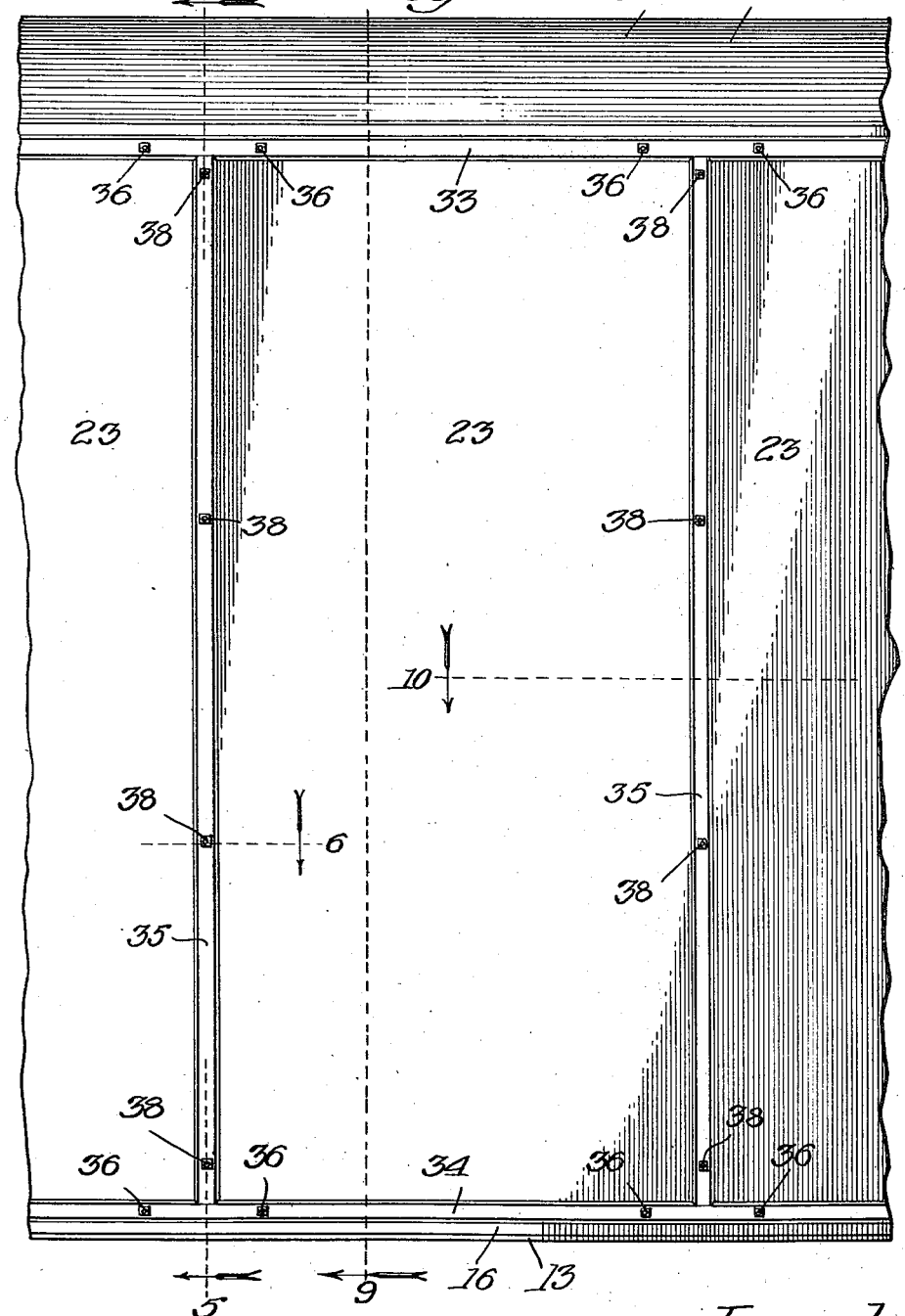

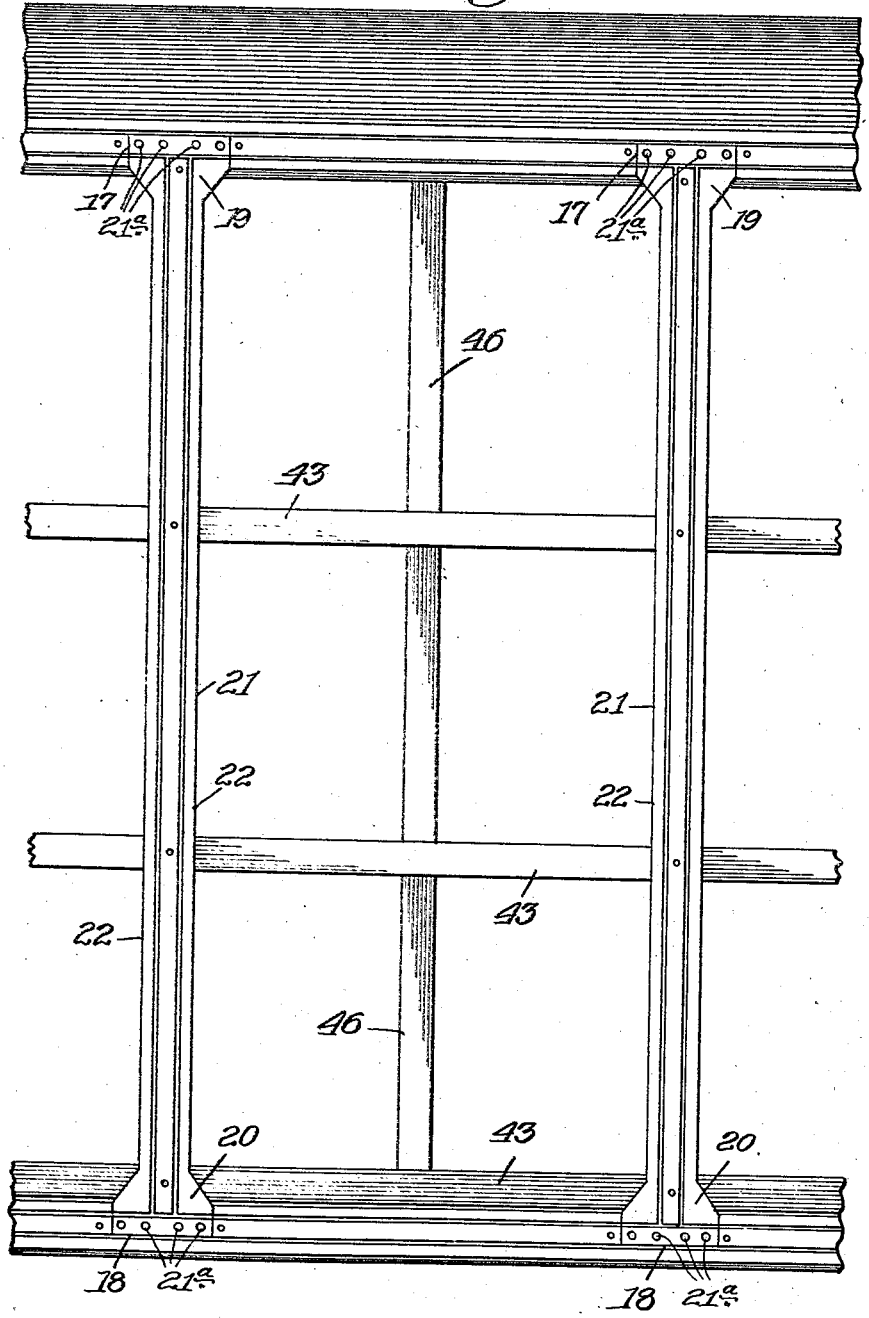

Oct. 15, 1935.  H. B. LINDSAY  2,017,629
INSULATED HOUSING STRUCTURE
Filed Nov. 9, 1931  6 Sheets-Sheet 4

Inventor:
Harvey B Lindsay,
Bryden forth, Lee, Chritton & Wiles,
Att'ys

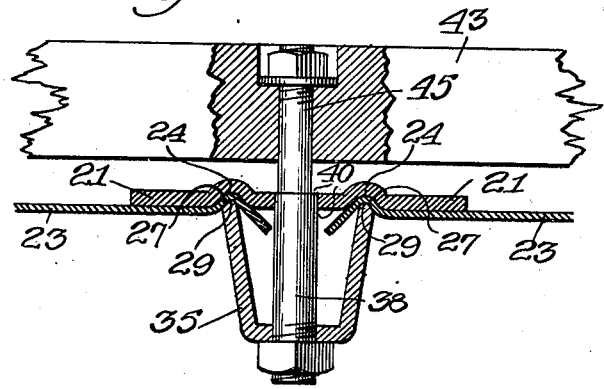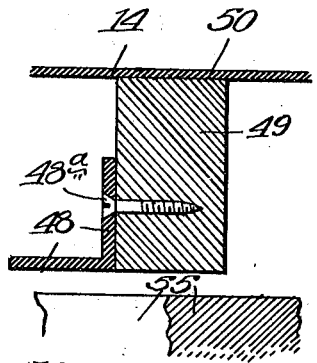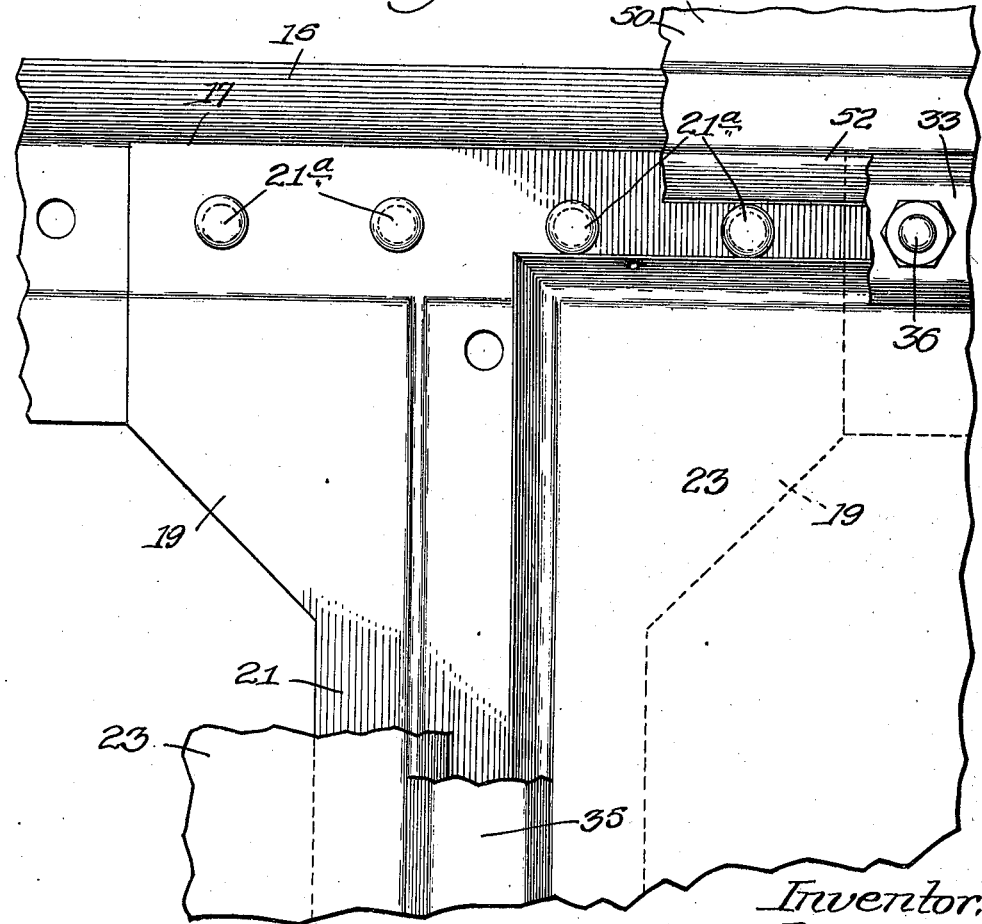

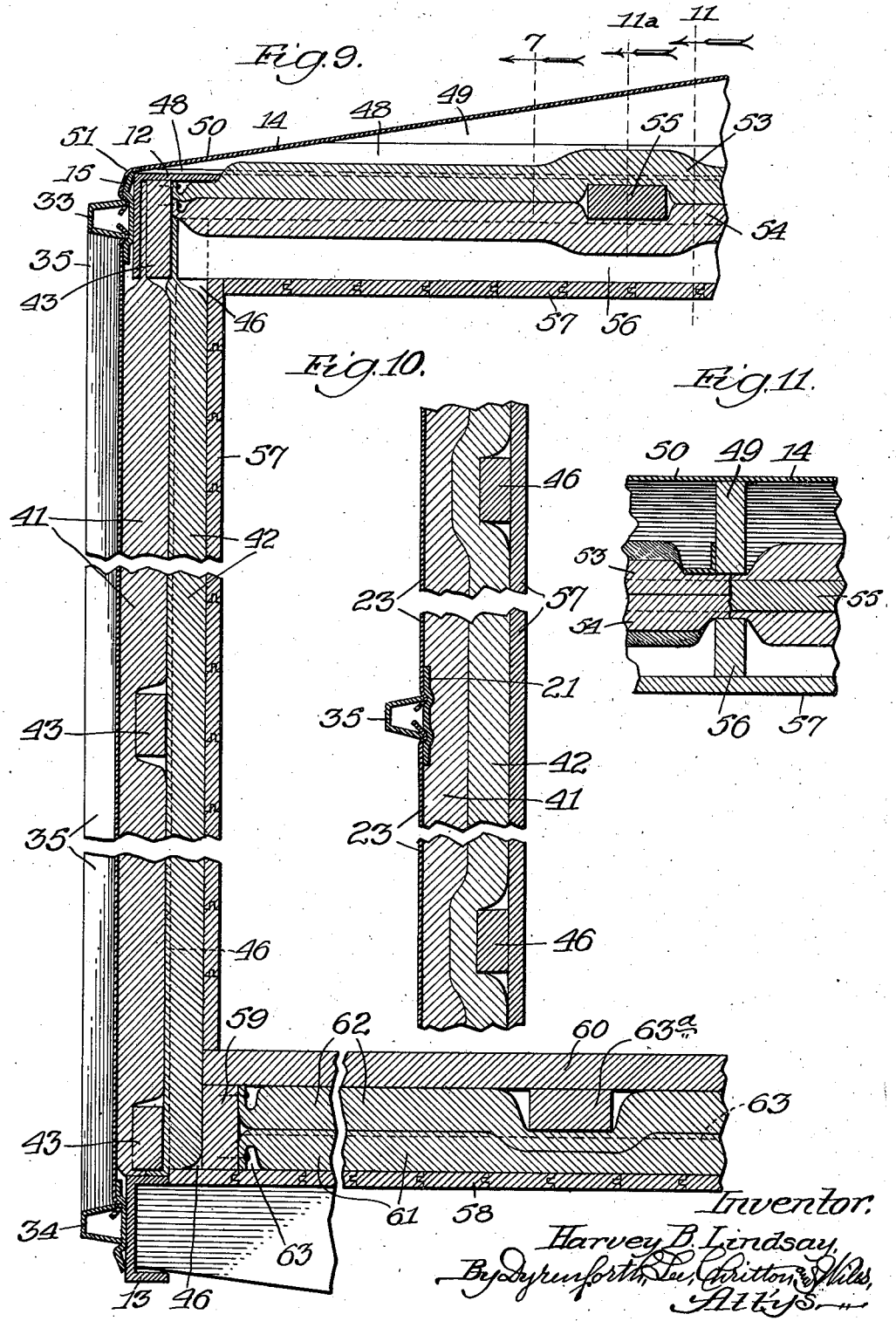

Patented Oct. 15, 1935

2,017,629

UNITED STATES PATENT OFFICE 2,017,629

INSULATED HOUSING STRUCTURE

Harvey B. Lindsay, Evanston, Ill.

Application November 9, 1931, Serial No. 574,006

10 Claims. (Cl. 105—409)

My invention as to certain phases thereof, relates to wall structures in general but more particularly to such structures constructed with metal framing and exterior metal sheathing for strength and durability of structure, as for example, and more particularly, structures for transport; the invention also relating to thermally insulated structures, as for example, and more especially, refrigerator structures in transport.

One of my objects is to provide a structure of the character above referred to which will present the maximum insulating capacity commensurate with the amount of insulating material used, and the parts of which may be readily assembled and disassembled for the setting up and knocking down of the structure and the removal or replacement of exterior parts which may be damaged, as for example, in the case of transport refrigerator structures as by "side-swiping"; and other objects as will be manifest from the following description.

Referring to the accompanying drawings:

Figure 1 is a face view of a portion of one of the side walls of a refrigerator car constructed in accordance with my invention.

Figure 2 is a similar view of the structure shown in Fig. 1 with the sheathing of the wall and the securing means therefor, removed.

Figure 3 is an enlarged broken section taken at the line 3 on Fig. 1 and viewed in the direction of the arrow, the insulating material for the wall being removed.

Figure 4 is a view like Fig. 3 of the upper portion of the frame structure intermediate the posts 21 with certain parts omitted.

Figure 6 is an enlarged broken sectional view taken at the line 6 on Fig. 1 and viewed in the direction of the arrow.

Figure 7 is an enlarged sectional detail of a portion of the roof structure of the car, the section being taken at the line 7 on Fig. 9 and viewed in the direction of the arrow.

Figure 8 is an enlarged face view showing a fragment of the structure illustrated in Fig. 1, with portions of certain parts broken away to illustrate the relative positions of the parts shown in this figure.

Figure 9 is a broken sectional view taken at the line 9 on Fig. 1 and viewed in the direction of the arrow, this view showing the insulation for the roof, side wall and floor of the car.

Figure 5:
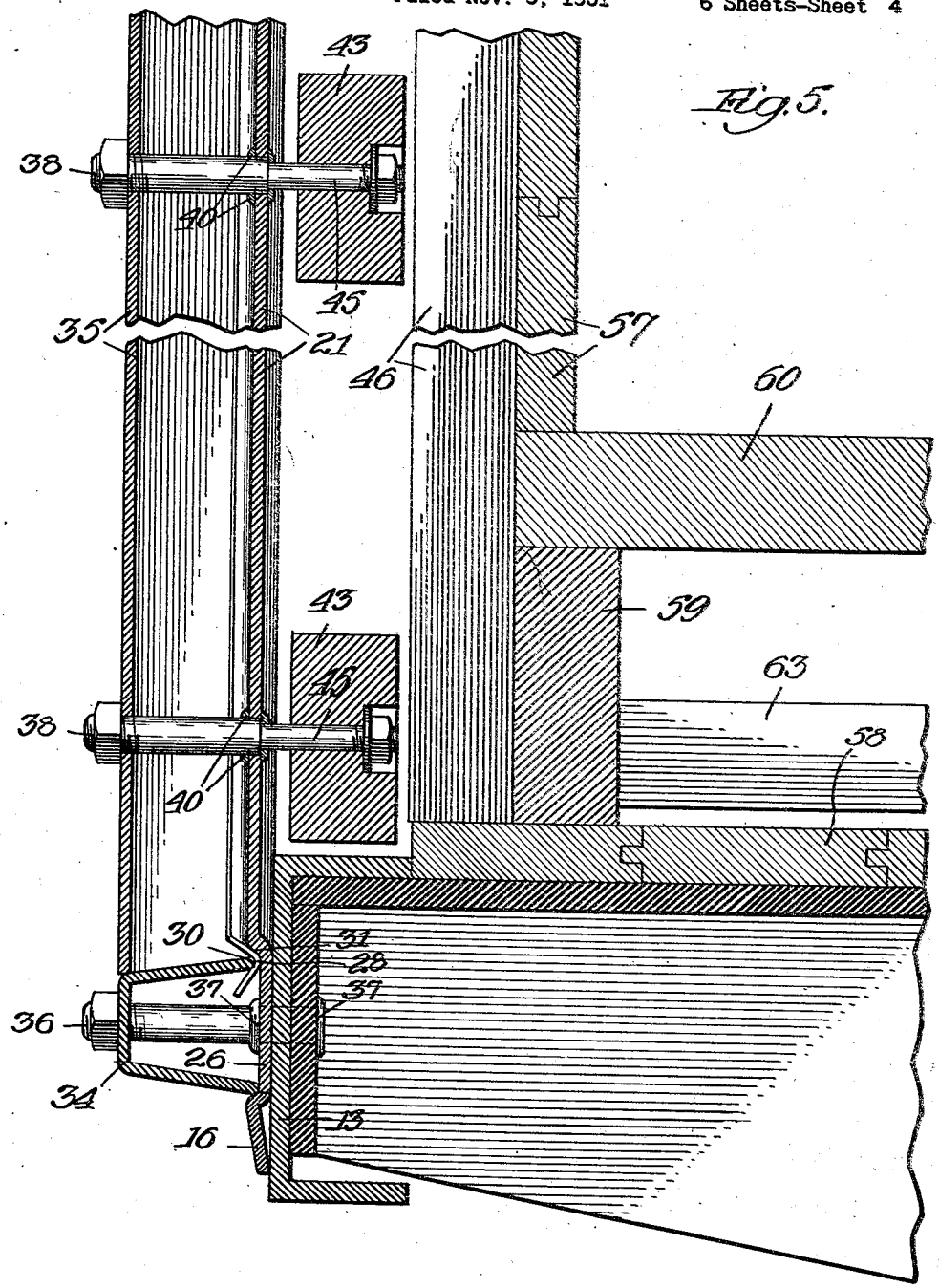
Figure 5 is an enlarged broken section taken at the line 5 on Fig. 1 and viewed in the direction of the arrow.

Figure 10 is a broken section taken at the line 10 on Fig. 1 and viewed in the direction of the arrow with the insulation in place; and Figure 11, a staggered broken sectional view taken at the lines 11 and 11ª on Fig. 9, the section of the left-hand portion of the structure of this figure being taken at the line 11, and the section of the right-hand portion thereof at the line 11ª.

Referring to the particular illustrated refrigerator car, its side walls comprise upper angle irons 12 and lower channels 13, the angle irons 12 constituting framing members for the roof of the car and represented generally at 14 and the channels 13 at the longitudinal sides of the car constituting the side sills thereof and forming parts of the car underframe the details of which are unimportant in connection with the present invention.

The side wall of the car comprises metal framework formed of an upper relatively thin framelike member 15 and a lower member 16 of similar character, these members extending lengthwise of the wall across the faces of the angle member 12 and the channel member 13 and being recessed at intervals along their lower and upper edges, respectively, as indicated at 17 and 18 to receive the widened upper and lower ends 19 and 20, respectively, of sheet metal posts 21 which are riveted, as indicated at 21ª, to the angle 12 and channel member 13. The framing thus formed presents openings represented at 22 which are closed by sheet metal plates 23 forming the sheathing of the side wall and held in place as hereinafter described.

The portions of the framing defining the openings 22 are provided on their outer faces with continuous grooves disposed in rectangular arrangements around the openings 22, these grooves comprising vertical grooves 24 in the posts which open at their upper and lower ends into wide and shallow grooves 25 and 26 in the members 15 and 16 and formed partly by the upper and lower terminal portions of the posts 21, the grooves 25 and 26 extending lengthwise of the wall.

The plates 23 are secured in position to close the openings 22 by channel bars disposed in rectangular arrangement and applied to the outer faces of the marginal edges of these plates. The upper and lower ones of the channel bars referred to are represented at 33 and 34, respectively, and the vertical ones of these bars and which are applied against the adjacent vertical edge portions of adjacent ones of the plates 23 at the posts 21, are represented at 35. The rear edges of the bars 33 and 34 extend into the grooves 25 and 26, the lower rear edge portion of bar 33 and the upper rear edge portion of bar 34 engaging, respectively, the top and bottom edges of the plates 23.

The channel bars 33 and 34 are drawn tightly against the horizontal edges of the plates 23 and held firmly in place by bolts 36 extending through the webs of these channel bars, and the upper angle 12 and the lower channel 13, respectively, the bolts being welded to the angle and channel, as shown and hereinafter explained as to the bolts 38. The channel bars 35 are drawn tightly against the vertical edges of the plates 23 and rigidly held in place by bolts 38 which extend through the webs of the bars 35 and the posts 21, the upper one of the bolts 38 also extending through the vertical flange of the angle 12 and being shouldered at its rear end as represented at 39, and the lower ones of these bolts being welded to the posts 21 as represented at 40.

The vertical and horizontal marginal edges of the plates 23 which are rectangular, are rearwardly deflected and form flanges as represented at 27 and 28, respectively, of channel form providing grooves 29 and 30 along their front faces into which the adjacent ones of the channel bars 33, 34 and 35 extend as shown, the plates 23 extending at their vertical deflected portions 27 into the grooves 24 of adjacent posts 21 and at their upper and lower horizontal deflected portions 28 into the grooves 25 and 26 along the upper and lower edges of the side wall, the horizontal flanges 28 bearing against the lower and upper walls 31 and 32, respectively, of the grooves 25 and 26.

Where the plates 23 forming the sheathing are of relatively heavy gauge the deflected portions 27 and 28 would be formed preliminary to the assembling of these plates with the other elements of the structure. However, where the plates 23 are of relatively light gauge metal they need not be preliminarily shaped to form the deflected portions at their edges, but reliance placed on their edges being bent into the grooves 25 and 26 when the channel bars 33, 34 and 35 are bolted down tight against the marginal edges of the plates. It will be seen that application of plain (that is, not corrugated), relatively thin sheets in this manner will result in placing the sheets in slight tension in each direction thereby providing a relatively light frame with the rigidity of a box structure, that is, a structure resistant to angular distortion in its plane by edgewise rigidity of the walls, as distinguished from rigidity provided by frame brace members. An exceedingly light strong structure results.

The joints between the plates 23 and the framing on which they are supported should be air and vapor tight. Should the metal to metal contact afforded between the plates 23 and framing referred to not be sufficient to produce such joints suitable gaskets, or gasketing material such as for example tacky asphalt, may be utilized between these parts.

The insulating material for the structure and shown as of blanket form and of any suitable material, comprises in this illustration, for the side wall, two flatwise opposed blankets 41 and 42 applied to extend across the framing and against the inner faces of the sheathing, the outer blanket 41 being held in place by a series of horizontal stringers 43, the upper one of which is held in place by extensions 44 of the upper bolts 36, and the lower one and the intermediate ones of which are held in place by extensions 45 of the lower bolts 38.

The inner blanket 42 is held in place by a series of vertical studs 46 preferably disposed in staggered relationship to the posts 21 and held in place by lag screws extending into the stringers 43 as shown of the lag screw 47 in Fig. 3.

The blankets 41 and 42, thus backed by the stringers 43 and studs 46, while compressed at these parts, extend in fulled, expansive, condition in the spaces provided between the framework formed of the stringers and studs as illustrated in the drawings.

The roof structure of the car comprises in addition to the angles 12, ties 48 shown as steel angle bars firmly secured to the horizontal flanges of the angles 12; joists 49 secured at 48ª to the ties 48 and disposed in spaced apart relation in a series lengthwise of the car with their upper surfaces inclined downwardly toward the sides of the car from the longitudinal center line of the latter; and an external sheathing member 50 of sheet metal the marginal edges of which are downwardly flanged as represented at 51 and deflected inwardly at 52 at which portions the sheathing is clamped in place in the grooves 25 by the rear edges of the upper portions of the bars 33, as shown in Fig. 3 to form air tight joints.

The roof portion also comprises insulating material shown as in the form of two flatwise opposed insulating blankets 53 and 54 of any suitable material, disposed beneath the joists 49, the blanket 53 being held in place by stringers 55 extending in spaced apart relation lengthwise of the car and secured in place in any suitable way; and the blanket 54 being held in place by transverse cross members 56 vertically alined with the joists 49 or staggered therewith, if preferred, and secured in place in any suitable way.

The interior of the car is lined along its side walls and ceiling with a lining structure 57 formed preferably of tongue and grooved boards.

The floor of the car comprises a subwood flooring 58 superposed on, and secured to, the underframe of the car, a framing around the side of the car and supported on the flooring 58, one of the members of this framing being shown at 59, and a flooring proper 60 supported on the framing referred to, the space between the flooring 58 and 60 containing insulating material as for example in the form of two insulating blankets 61 and 62, held against lateral displacement by subjoists extending crosswise of the car and resting on, and secured to, the subfloor 58, one of these subjoists being shown at 63, and spaced apart stringers located above the blankets 62 and extending lengthwise of the car and secured to the subjoists 63, as for example by lag screws (not shown), which pass through the blankets 61 and 62, the main floor 60 resting on, and being secured to, the stringers 63ª.

The provision of the thin framing referred to presents the great advantage of preventing heat leakage by means of frame members, particularly metal, extending from the outside any considerable distance into the insulation space, and of reserving practically the entire wall space for the insulation, except for the internal framing, which is preferably of wood, and required to carry the insulation and the inner wall lining, thereby affording the maximum insulating capacity to the structure for a given thickness of wall which is of importance, especially in refrigerator cars, because of the limitations of economy and other reasons; and the forming of the structure of separate removable parts renders easy and inexpensive the making of repairs and replacements, which is also of especial importance in refrigerator car or truck body construction inasmuch as such vehicles are liable to become side-swiped with resultant damage to the exterior, exposed, portions of the side walls of the vehicle.

Furthermore, the provision of the sheathing and securing means therefor as separate disconnectible members is of advantage where it is desired that the structure have the capability of being knocked-down and readily set up.

As will be understood from the foregoing description the bars 33, 34, and 35 serve not only as means for securing the sheathing plates 23 in position with air-tight joints between them and the framing against which they are positioned, but also serve to protect the sheathing 23 against damage and function as entirely satisfactory external stiffeners for the framing which latter, as above explained, is relatively shallow in a direction perpendicular to the wall.

By providing this framing and sheathing assembly as described it presents high resistance to distortion in the plane of the wall and by employing the stiffeners 33, 34, and 35 highly resists distortion in planes other than that of the wall.

While I have illustrated and described a particular construction embodying my invention, I do not wish to be understood as intending to limit it thereto as the same may be variously modified and altered without departing from the spirit of my invention. Thus, by way of example, the internal wall and insulating structure involving the studs, stringers and blankets, need not be provided in the form shown but may be provided in any other form if desired. Furthermore, while I have chosen to disclose all of the features of my invention in an insulated structure, I do not wish to limit the protection as to certain features thereof, to their use in such a structure as they may be utilized to advantage in a structure in which no insulation is provided.

What I claim as new, and desire to secure by Letters Patent, is:

1. An insulated structure having a wall portion comprising a framing shallow in a direction perpendicular to the plane of the wall relative to the thickness of the insulated structure, sheathing, insulating material extending over said framing and sheathing, and means for holding said sheathing to said framing in fixed relation to said framing comprising members located exterior of said sheathing and connecting means between said members and framing, said members being of a depth greater than said framing and serving as stiffening means for said framing.

2. A housing structure comprising, in combination: a sill member; a longitudinally grooved plate member; longitudinally grooved studding members connecting the first named members; side wall sheathing sheets extending between said members with their margins entering said grooves; a roof sheathing sheet covering the upper edge of said plate member with its margin entering a groove therein; a vertical clamping member substantially coextensive with each studding member; a longitudinal clamping member substantially coextensive with said plate member; said clamping members secured to the first named members and pressing adjacent margins of the sheathing sheets into said grooves with snubbing of each about an edge of a groove.

3. A heat insulated structure comprising, in combination: a frame comprising spaced, parallel, upper and lower members; plate-like posts connecting said members; sheathing plates secured at substantially vapor-tight joints to said frame members; a blanket of relatively loose insulating material secured to said frame and against said sheathing by longitudinal stringers secured to said posts; a second like blanket secured to said stringers by vertical studs; and an interior sheathing secured to said studs; the bodies of said blankets being compressed only along said stringers and said studs and the only areas of compression common to both of said bodies being at the intersections between said studs and stringers.

4. A heat insulated structure comprising, in combination: a frame comprising spaced, parallel upper and lower members, and plate-like posts connecting said spaced members; stud bolts secured in said frame and projecting exteriorly and interiorly therefrom; sheathing plates lapping with said frame members; exterior clamping and stiffening members secured upon said stud bolts to clamp the margins of said plates to said frame; a heat insulating blanket in contact with the interior of said frame and sheathing, pierced by said stud bolts; and longitudinal stringers secured on said stud bolts to press said blanket against the frame and sheathing.

5. A housing structure comprising, in combination: frame members assembled to define openings; said members formed to present grooves parallel with all sides of each opening; clamping members dimensioned to enter said grooves and of lengths to be substantially coextensive therewith; imperforate sheathing sheets covering said openings; each margin of said sheets forced into one of said grooves by one of said coacting clamping members and formed into a reverse bend about the edge of the groove and the contacting portion of the clamping member to form rigid vapor-tight joints between sheets and frame and to develop bracing of said sheets in their planes to prevent angular distortion of said openings.

6. A housing structure comprising, in combination: frame members assembled to define openings; said members formed to present grooves parallel with all sides of each opening; clamping members dimensioned to enter said grooves and of lengths to be substantially coextensive therewith; each clamping member formed with parallel ribs on their clamping faces to lie closely adjacent to and parallel with the sides of said grooves; imperforate sheathing sheets covering said openings; each margin of said sheets forced into one of said grooves by a coacting clamping member and formed into a reverse bend about the edge of the groove and the contacting portion of the rib of the clamping member to form rigid vapor-tight joints between sheets and frame and to develop bracing of said sheets in their planes to prevent angular distortion of said openings.

7. A housing structure comprising, in combination: vertical and horizontal frame members assembled to define openings; said frame members formed to present grooves parallel with all sides of each opening; clamping channels providing clamping means at the free edges of their flanges; imperforate sheathing sheets covering each of said openings; each margin of each sheet forced into one of said grooves and deformed into a reverse bend by an edge of a clamping channel to form rigid vapor-tight joints between sheets and frame and to develop bracing effect of said sheets in their planes to prevent angular distortion of said openings.

8. A housing box-structure comprising, in combination: frame members of relatively slight thickness assembled to define openings; said members formed to provide grooves entirely surrounding said openings; relatively thin, imperforate sheathing sheets covering said openings; clamping and frame-stiffening members rigidly pressing the margins of said sheets against the bottoms of the grooves with deflection and snubbing of the material of the sheets over the side walls of the grooves whereby to place said sheets under tension and to provide a housing of box-structure characteristics.

9. A housing box-structure wall comprising, in combination: a frame comprising longitudinal and transverse members assembled to define openings; relatively thin imperforate sheathing sheets placed upon said frame under tension in all directions and covering said openings; and means to clamp each margin of each of said sheets to said frame members continuously about said openings; whereby tensile strength of the sheathing will act in the plane of the sheets to resist angular deformation of the frame.

10. A vapor-tight housing structure wall comprising, in combination: frame members assembled to define openings and formed to provide grooves surrounding said openings; imperforate sheathing sheets covering said openings with each of their margins entering one of said grooves; sealing material applied to the joints between said sheets and frame members; and clamping members rigidly pressing all margins of said sheets against the bottoms of said grooves whereby to prevent cracking of said sealing material.

HARVEY B. LINDSAY